A. C. & S. W. SMITH.
TIRE PROTECTOR AND TREAD GRIP.
APPLICATION FILED MAY 17, 1910.
968,706.
Patented Aug. 30, 1910.
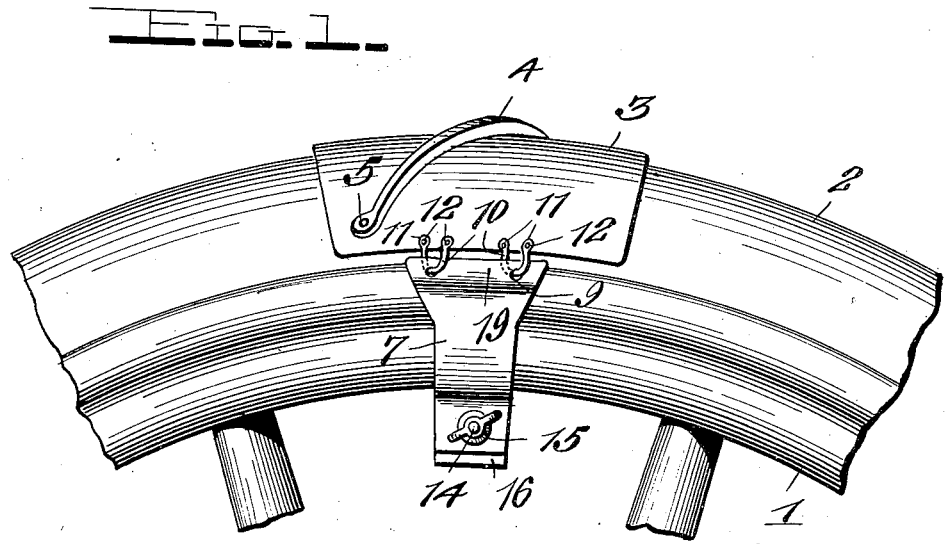
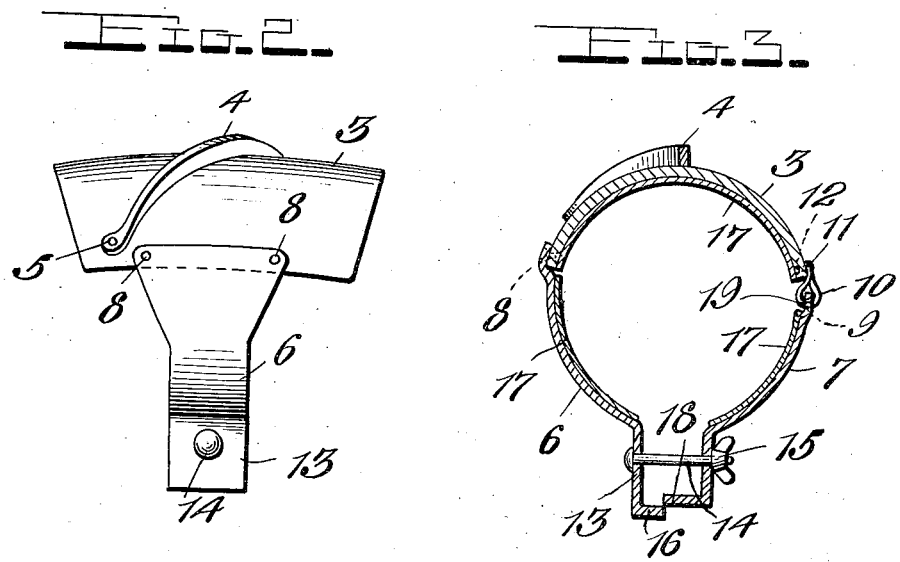
Witnesses
Chas. L. Griesbauer.
E. M. Ricketts
Inventors
A. C. Smith and
S. W. Smith,
By Watson E. Coleman,
Attorney

UNITED STATES PATENT OFFICE.

ALBERT C. SMITH AND SIDNEY W. SMITH, OF ALBION, ILLINOIS.

TIRE-PROTECTOR AND TREAD-GRIP.

968,706.  Specification of Letters Patent.  Patented Aug. 30, 1910.

Application filed May 17, 1910. Serial No. 561,914.

*To all whom it may concern:*

Be it known that we, ALBERT C. SMITH and SIDNEY W. SMITH, citizens of the United States, residing at Albion, in the county of Edwards and State of Illinois, have invented certain new and useful Improvements in Tire-Protectors and Tread-Grips, of which the following is a specification, reference being had to the accompanying drawings.

This invention relates to improvements in tire protectors and tread grips.

The object of the invention is to provide a simple and practical device of this character which may be quickly and easily applied to and removed from the wheel of an automobile or the like without marring or injuring the same, which when applied to the wheel will not only protect the tire, but also serve as a grip or anti-slipping device; and which when removed from the tire may be conveniently carried in the automobile or machine.

With the above and other objects in view, the invention consists of the novel construction, combination and arrangement of parts, hereinafter fully described and claimed, and illustrated in the accompanying drawings in which:—

Figure 1 is a side view of a portion of an automobile wheel showing the application of the invention; Fig. 2 is a detail view of the other side of the device; and Fig. 3 is a cross sectional view.

In the drawings 1 denotes the rim of an automobile or the like, 2 the rubber tire therefor and 3 one of my improved tire protectors and tread grips. These devices may be arranged at any suitable intervals around the wheel and may be of any length so as to cover any portion of the tire. They may of course be placed close together so as to protect the entire surface of the tire, or they may be placed at different distances apart to serve merely as anti-friction grips.

Each of the devices 3 consists of a plate of metal or other suitable material curved transversely to fit the tread surface of the tire, and on its outer surface is arranged an anti-slipping rib 4 which is preferably removably secured by fastenings 5, and which may extend either diagonally across the plate or member 3, or longitudinally of the same. On the devices used on the steering wheels of the machine I preferably employ the longitudinal ribs, while on the devices used on the driving wheels I preferably employ the diagonally arranged ribs.

6 and 7 denote two attaching plates or strips which are made of lighter material, and attached to the side edges of the plate 3 so as to extend inwardly around the rim 1. The strip 6 is rigidly secured by rivets 8, while the strip 7 is hingedly connected at the opposite side of the plate 3 by providing it with openings 9 to receive U-shaped links 10, the ends 11 of which are enlarged and apertured to receive rivets 12 which fasten said links to the plate 3. The free ends of the two strips 6, 7, are reduced and curved to fit the rim, and their extremities are bent to form right angularly projecting apertured ears 13 which receive a removable clamping bolt 14 provided with a wing nut 15. One of the ears 13 is bent at right angles to form a stop 16 which retains the two ears in alinement. The other strip 7 has the extremity of its ear bent at right angles to form a similar but longer stop 18, and said strip 7 has its other end offset, as shown at 19, so that the links 11 will be disposed out of contact with the rim of the wheel or the tire. On the inner face of the plate 3 and the inner faces of the attaching strips 6, 7, I provide a lining of canvas, rubber or other cushioning material which is indicated at 17 and which will protect the tire and rim of the wheel against being cut, scratched or otherwise injured when the device is applied.

The attaching strips 6, 7, are made of lighter material than the plate 3, and they are made of flexible sheet metal or other flexible material.

From the foregoing it will be seen that the peculiar construction of the device enables it to be readily applied to and removed from a wheel, that when applied it effectively protects the tire and prevents slipping or skidding of the wheel, and that when removed from the wheel it will occupy but little space and a number of them may be conveniently carried in the automobile.

Various changes in the form, proportion and arrangement of parts may be made within the spirit and scope of the invention.

Having thus described the invention, what is claimed is:

A device of the character described, comprising a plate curved transversely to engage the tread surface of the tire, a rib arranged on the outer face of said plate, two curved attaching strips, rivets uniting one of said strips to one side edge of said plate, the other strip having openings, U-shaped links passed through the openings in the last mentioned strip and having apertured ends riveted to the other side of said plate, the reduced ends of said strips being bent to form apertured ears, and a removable clamping bolt arranged in said apertured ears.

In testimony whereof we hereunto affix our signatures in the presence of two witnesses.

ALBERT C. SMITH.
SIDNEY W. SMITH.

Witnesses:
 JOEL BROWN,
 ALVIN C. LOW.